United States Patent
Volkov et al.

(10) Patent No.: US 6,839,647 B2
(45) Date of Patent: Jan. 4, 2005

(54) SAME VIRTUAL MACHINE MODE FOR DISTRIBUTED TEST EXECUTION

(75) Inventors: Alexei Volkov, Mountain View, CA (US); Allan S. Jacobs, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 54 days.

(21) Appl. No.: 10/241,091

(22) Filed: Sep. 10, 2002

(65) Prior Publication Data

US 2004/0049362 A1 Mar. 11, 2004

(51) Int. Cl.$^7$ .............................................. G06F 15/00
(52) U.S. Cl. ..................... 702/119; 702/122; 714/33; 709/203
(58) Field of Search .................... 702/119; 709/203; 700/18, 19, 20

(56) References Cited

U.S. PATENT DOCUMENTS

| 6,510,352 B1 | * | 1/2003 | Badavas et al. | 700/19 |
| 6,542,845 B1 | * | 4/2003 | Grucci et al. | 702/122 |
| 6,560,721 B1 | * | 5/2003 | Boardman et al. | 714/33 |

* cited by examiner

*Primary Examiner*—Kamini Shah
(74) *Attorney, Agent, or Firm*—Martine & Penilla, LLP

(57) ABSTRACT

An invention is provided for testing in a Java based environment. The method includes launching a test harness in a first JVM, and starting a virtual machine (VM) agent in a second JVM. The VM agent is placed in communication with the test harness. The VM agent then executes a test application such that both the test application and the VM agent execute in the second JVM. In this manner, the VM agent is restarted using the test harness if the second JVM fails.

18 Claims, 5 Drawing Sheets

SAME VIRTUAL MACHINE MODE FOR DISTRIBUTED TEST EXECUTION

BACKGROUND OF THE INVENTION

1. Field of the Invention

This invention relates generally to testing in Java based environments, and more particularly to an enhanced method for same virtual machine mode testing capable of self-recovery.

2. Description of the Related Art

As the use of software in performing daily tasks rapidly increases, assessing software reliability through software testing has become an imperative stage in the software development cycle. As is well known, software testing is used to find and eliminate defects (i.e., bugs) in software, which if undetected, can cause the software to operate improperly. One method for performing testing in a Java environment is via a test harness. FIG. 1 is a block diagram showing a prior art testing configuration 100, wherein the test harness and each test are executed in separate virtual machines.

By way of background, Java is an interpreted language that utilizes a Java Virtual Machine (JVM) as an interpreter. The JVM is a software layer that converts Java intermediate language (bytecode) into machine language. As shown in FIG. 1, a test harness is executed on a computer system 102 within a first JVM 104. In addition, a test is executed within a second JVM 106, which is separate from the first JVM 104 executing the test harness. Generally, both the first JVM 104 and the second JVM 106 are executed on a single computer system 102, although it should be noted that the prior art testing configuration can run multiple tests, each in its own JVM.

The prior art testing configuration 100 is often referred to as "other virtual machine (VM) mode" because each test is executed in a JVM 106 separate from the JVM 104 of the test harness. In operation, the test harness typically runs a test suite, which is a collection of related tests, by starting a new JVM 106 for each test of the test suite. When each test is complete, the test harness stops the JVM executing the particular test. Because each test is executed within its own JVM 106, any failure in the JVM 106 will only affect the particular test executing within that JVM 106. That is, the test harness 104 will not be affected. Other tests executing in separate JVMs also will not be affected by the failure of any one test JVM. As a result, "other VM mode" is considered a safe and reliable method for performing testing in a Java based environment.

An important task of a test harness is to provide a flexible environment for stress testing. Many techniques exist to increase stress level when testing a product. For example, special test cases can be created that are specifically designed to stress the tested system. However, in the case of Java, the stress level can be doubled by implementing "same VM mode" testing, as illustrated next with reference to FIG. 2.

FIG. 2 is a block diagram showing a prior art testing configuration 200, wherein the test harness and each test are executed in the same virtual machine. As shown in FIG. 2, the test harness is executed on a computer system 102 within a JVM 104. However, instead of starting a new JVM for each test, the test harness calls test subroutines 202 to execute the various tests of a test suite. Similar to FIG. 1, the prior art testing configuration 200 can run multiple tests within the test harness JVM 104.

The prior art testing configuration 200 is often referred to as "same VM mode" because each test is executed in the same JVM as the JVM 104 of the test harness. Because the test harness 104 is not required to start and stop separate JVMs for each test, same VM mode testing generally is six to ten times faster than "other VM mode" testing. In addition, same VM mode stresses the system in a different manner than "other VM mode" testing, generally resulting in increased stress that improves testing. For example, the HEAP configuration and the threading environment are different, that is, a different memory use pattern emerges and a different set of threads is executed. Whereas in "other VM mode" tests are isolated from the other test environments, in same VM mode environment interactions result in different thread synchronization issues and different system interrupts. As a result, increased stressing can be achieved, which results in a better test.

Unfortunately, same VM mode test configurations 200 are generally less reliable. For example, because the test harness and all the tests are executed within a single JVM 104, the remainder of the test suite will not be performed if the JVM 104 fails. For example, if a JVM executing a test suite including 10,000 tests fails on the $100^{th}$ test, the remaining 9,900 tests will not be performed. Since many tests are large, and thus left executing overnight, errors may not be found until the following morning, thus increasing test time and decreasing testing efficiency.

In view of the foregoing, there is a need for systems and methods that provide the benefits of "same VM mode" testing, while having the robustness of "other VM mode" testing. The methods should provide the speed and stress increasing properties of same VM mode, and the self-recovery ability of "other VM mode."

SUMMARY OF THE INVENTION

Broadly speaking, the present invention fills these needs by providing an enhanced same VM mode testing configuration. The embodiments of the present invention provide the speed and stress increasing properties of same VM mode testing, and the self-recovery ability of "other VM mode" testing. In one embodiment, a method for performing testing in a Java based environment is disclosed. The method includes launching a test harness in a first JVM, and starting a virtual machine (VM) agent in a second JVM. The VM agent is placed in communication with the test harness. The VM agent then executes a test application such that both the test application and the VM agent execute in the second JVM. In this manner, the VM agent can be restarted using the test harness if the second JVM fails.

In an additional embodiment, a system is disclosed for performing testing in a Java based environment. The system includes a test harness that is executed in a first JVM, and a VM agent that is executed in a second JVM. As above, the VM agent is in communication with the test harness. In operation, the VM agent is capable of launching test applications in the second JVM based on test data received from the test harness. Moreover, the test harness is capable of restarting the VM agent using if the second JVM fails.

A system for performing testing in a distributed Java based environment is disclosed in a further embodiment of the present invention. The system includes a test harness that is executed in a first JVM, which is located on a first computer system. A harness client is executed in a second JVM, which is located on a second computer system. The harness client is in communication with test harness. Also on the second computer system is a VM agent, which is executed in a third JVM. The VM agent is in communication with the harness client. In this manner, the harness client facilitates communication between the test harness and the VM agent. Also the VM agent can launch test applications in the third JVM based on test data received from the test harness via the harness client. As above, the test harness is capable of restarting the VM agent if the third JVM fails. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an enhanced same VM mode testing configuration for distributed test execution. The embodiments of the present invention provide the speed and stress increasing properties of same VM mode testing, and the self-recovery ability of "other VM mode" testing. Broadly speaking, embodiments of the present invention provide same VM agents, which are executed within JVMs separate from the test harness JVM. Each same VM agent performs same VM mode testing for tests that are provided by the test harness. As a result, the test harness can detect failed agent JVMs executing the same VM agents and can restart the agent JVMs and same VM agents to continue processing the test suite. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
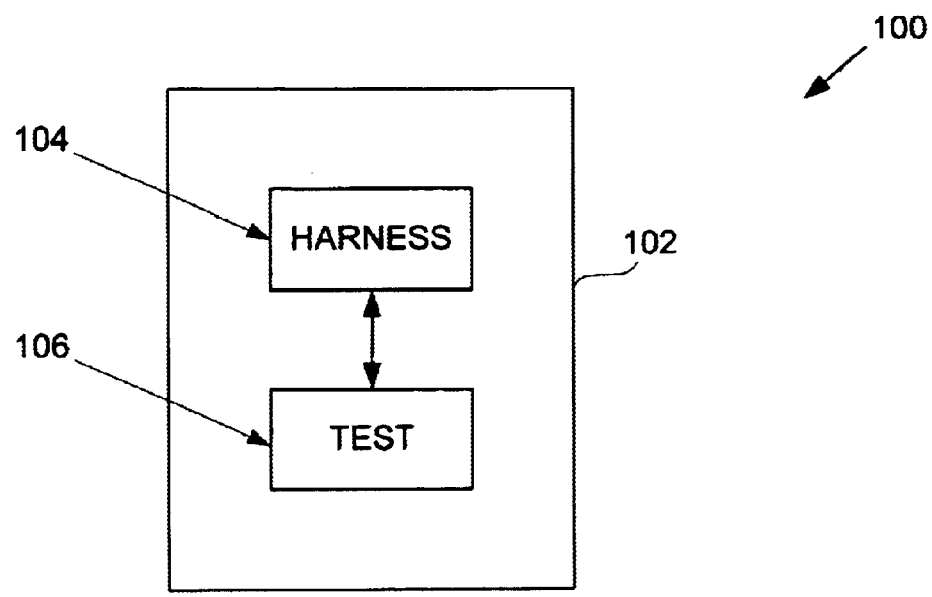
FIG. 1 is a block diagram showing a prior art testing configuration, wherein the test harness and each test are executed in separate virtual machines.
Figure 2:
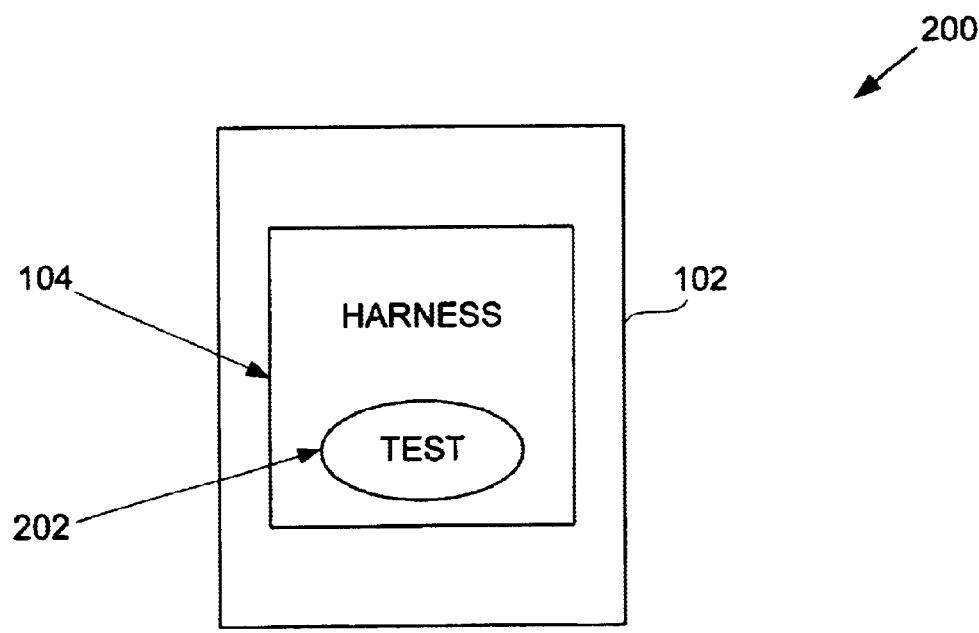
FIG. 2 is a block diagram showing a prior art testing configuration, wherein the test harness and each test are executed in the same virtual machine.
Figure 3:
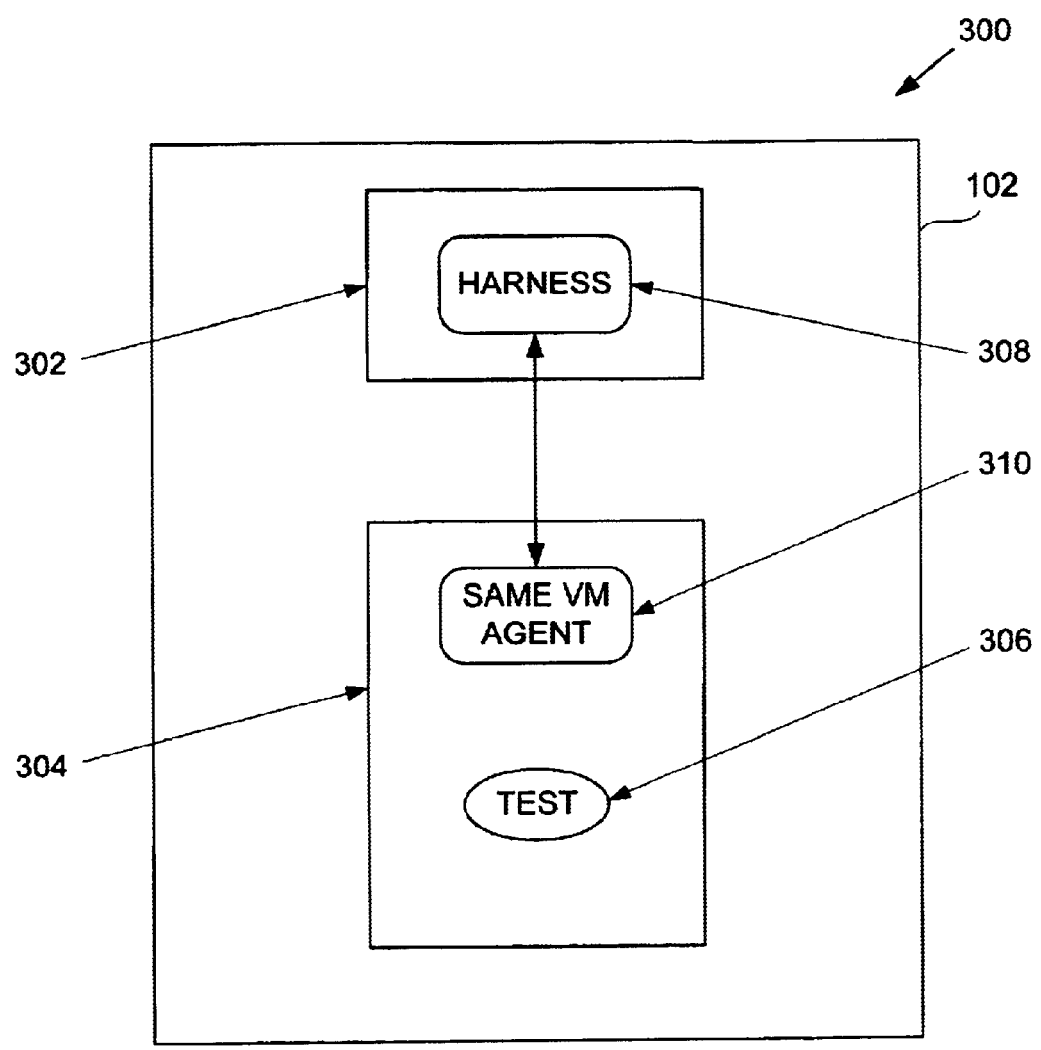
FIG. 3 is a block diagram illustrating an agent based same VM mode test configuration, in accordance with an embodiment of the present invention.

FIGS. 1 and 2 were described in terms of the prior art. FIG. 3 is a block diagram illustrating an agent based same VM mode test configuration 300, in accordance with an embodiment of the present invention. As shown in FIG. 3, the same VM mode test configuration 300 includes a harness JVM 302, which executes a test harness 308. The test harness 308 is in communication with a "same VM agent" 310 that is executed in an agent JVM 304, which is separate from the harness JVM 302. As used herein, the term "same VM agent" will be used to refer to any testing agent software in communication with the test harness and that is capable of executing tests 306 via subroutine calls.

As can be appreciated, embodiments of the present invention typically are implemented using Java as a programming language, which is designed to generate applications that can run on all hardware platforms, small, medium and large, without modification. Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

Java is an interpreted language, in that the source code of a Java program is compiled into an intermediate language called "byte code." The byte code is then converted (interpreted) into machine code at runtime. For example, upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software.

With the above explanation in mind, embodiments of the present invention achieve increased robustness by separating the harness JVM 302, which executes the test harness 308, from the agent JVM 304 in which the actual tests 306 are executed. Specifically, a same VM agent 310 is executed in the agent JVM 304 and placed in communication with the test harness 308, which is executing in the harness JVM 302. Typically, communication is achieve via sockets, however, it should be noted that any form of communication configuration can be utilized that facilitates data transfer between the test harness 308 and a same VM agent 310.

Generally, the test harness 308 is provided with a test suite. As is well known, a test suite generally comprises a plurality of tests designed to test particular aspects of software and/or hardware present on the test system. Although embodiments of the present invention will be described in terms of processing test suites, it should be noted that any test configuration can be utilized with the embodiments of the present invention. That is, the harness JVM 302 can be used to execute any overall test control software, and each agent JVM 304 can be utilized to execute any agent software capable of communicating with the test control software and processing individual tests.

In operation, the test harness 308 starts a separate agent JVM 304 and executes a same VM agent 310 in the agent JVM 304. For example, in FIG. 3, the test harness 308 starts the agent JVM 304 and executes the same VM agent 310 to process the tests of the test suite. Although FIG. 3 illustrates a single agent JVM, it should be noted that any number of agent JVMs can be utilized in conjunction with the test harness and harness JVM to process tests of the test suite. Each same VM agent 310 utilized for test processing is executed in a separate agent JVM 304.

Once the same VM agent 310 is executed and placed in communication with the test harness 308, the test harness 308 begins transmitting test data to the same VM agent 310. Upon receiving the test data from the test harness 308, the same VM agent 310 executes the test 306 using a subroutine call. Since the test 306 is executed in the same JVM as the same VM agent 310, namely the agent JVM 304, embodiments of the present invention advantageously gain the benefits of same VM mode test execution.

Moreover, unlike prior art "other VM mode" testing, tests can be executed using the same VM agent 310 without stopping the agent JVM 304, or starting a new agent JVM 304. As a result, the test harness 308 is not required to continually start and stop separate JVMs for each test. Thus, embodiments of the present invention generally execute six to ten times faster than "other VM mode" testing. In addition, embodiments of the present invention advantageously are capable of increasing stress to the system. For example, in one embodiment, the same VM agent 310 can artificially increase stress to the agent JVM 304 by executing additional jobs, such as additional tests 306, within the agent JVM 304. In this case, the additional tests 306 are primarily designed to increase stress to the agent JVM 304, rather than to test particular aspects of the system.

Since the same VM agent 310 executes tests 306 in a manner similar to same VM mode, the same VM agent 310 stresses the system in a different manner than "other VM mode" testing, generally resulting in increased stress that improves testing. For example, as noted previously, the HEAP configuration and the threading environment are different when multiple tests are executed in the same JVM. That is, a different memory use pattern emerges and a different set of threads is executed. Whereas in "other VM mode" each test is isolated from other test environments, the same VM agent 310 of the embodiments of the present invention allows test interactions, which result in different thread synchronization issues and different system interrupts. Consequently, increased stressing can be achieved, which results in a better test.

However, unlike conventional same VM mode testing, embodiments of the present invention can continue to process the test suite when the agent JVM 304 fails. Specifically, the test harness 308 monitors the agent JVM 304 to detect when an agent JVM 304 fails. In response, the test harness 308 can restart the agent JVM 304 and re-execute the same VM agent 310. The test harness 308 can then continue to transmit test data to the new same VM agent 310 and continue processing the test suite. As a result, a single test result is lost, in contrast to losing the remainder of the test suite as occurs in prior art same VM mode testing configurations, discussed above with reference to FIG. 2. Further, in some embodiments, the test harness 308 can be configured to rerun any tests in progress when the agent JVM 304 fails. As a result, execution of the entire test suite can be assured.

Figure 4:
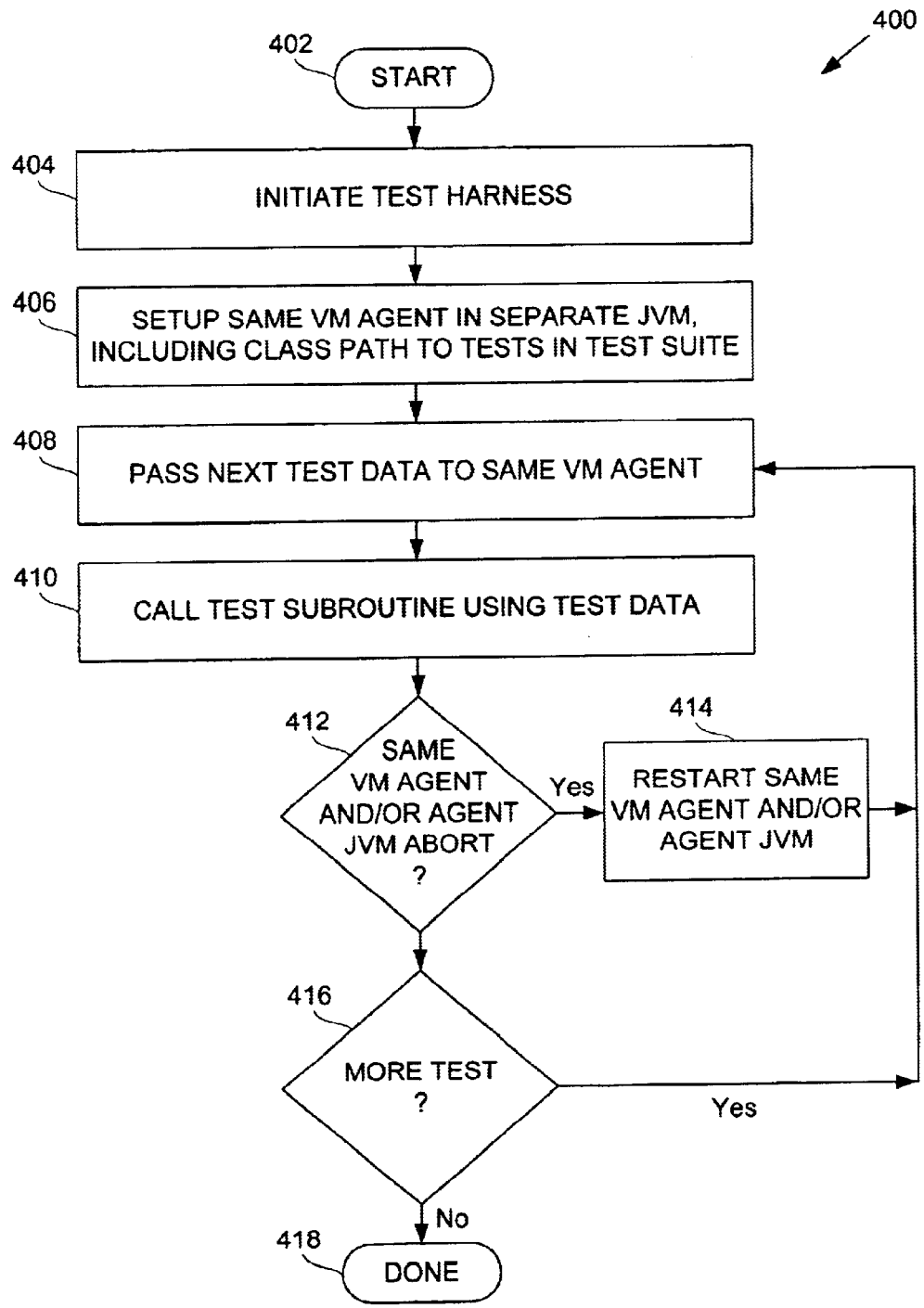
FIG. 4 is a flowchart showing a method for performing testing in a Java environment utilizing an enhanced same VM mode configuration, in accordance with an embodiment of the present invention.

FIG. 4 is a flowchart showing a method 400 for performing testing in a Java environment utilizing an enhanced same VM mode configuration, in accordance with an embodiment of the present invention. In an initial operation 402, preprocess operations are performed. Preprocess operations can include, for example, configuring a test suite, selecting particular computer system configurations appropriate for the tests, and other preprocess operations that will be apparent to those skilled in the art.

In operation 404, the test harness is initiated. The test harness is executed in harness JVM, which is separate from the JVM wherein the tests will be executed. Generally, the test harness is initiated with a test suite comprising a plurality of tests. The actual test files can be stored on a storage device local to the computer system executing the actual tests, however, remote test file storage can be utilized with the embodiments of the present invention.

A same VM agent is executed in an agent JVM that is separate from the harness JVM, in operation 406. The same VM agent typically is initiated with the class path of the individual tests in the test suite to be executed. Generally, tests within a test suite share the same class path. Hence, by initiating the same VM agent with the class path of the tests, the test harness needs to transmit less test data to the same VM agent. However, it should be borne in mind that embodiments of the present invention can be utilized in environments wherein all information regarding individual tests is transmitted to the same VM agent at runtime.

Once both the test harness and same VM agent are executing and in communication with each other, the test data for the next test is passed from the test harness to the same VM agent, in operation 408. Broadly speaking, the test data passed to the same VM agent includes the name of the test and how to invoke the test. Specifically, the test harness passes the class name of the tests, the method name utilized to invoke the test, and any arguments associated with the method that are to be passed on the stack.

In operation 410, the same VM agent calls the test subroutine using the test data. As discussed above, the test data includes the name of the method utilized to invoke the particular test in the test suite. In addition, the test data includes any arguments associate with the method. Thus, in operation 410, the same VM agent performs the class loading for the test and invokes the test method using the arguments passed in operation 408. A decision is then made as to whether the agent JVM has aborted, in operation 412. During testing, particular tests may inadvertently cause the same VM agent and/or the agent JVM to abort. Hence, if the agent JVM has aborted, the method 400 branches to operation 414. Otherwise, the method 400 continues to operation 416.

In operation 414, the agent JVM and the same VM agent are restarted. Embodiments of the present invention can continue to process the test suite when the agent JVM fails. The test harness can detect the agent JVM failure and, in response, restart the agent JVM and re-execute the same VM agent. The method 400 then continues to operation 408, where the test harness passes test data for the next test in the test suite to the new same VM agent. As a result, a single test result is lost instead of losing the remainder of the test suite, as occurs in prior art same VM mode testing configurations. As mentioned above, in some embodiments, the test harness can be configured to rerun any tests in progress when the agent JVM fails.

In operation 416, a decision is made as to whether additional tests remain to be performed in the test suite. If additional tests remain to be performed in the test suite, the test harness passes the test data for the next to test to the same VM agent in operation 408. Otherwise, the method 400 is completed in operation 418, where post process operations are performed. Post process operations can include loading additional test suites, examining test results, and other post process operations that will be apparent to those skilled in the art after a careful reading of the present disclosure.

Figure 5:
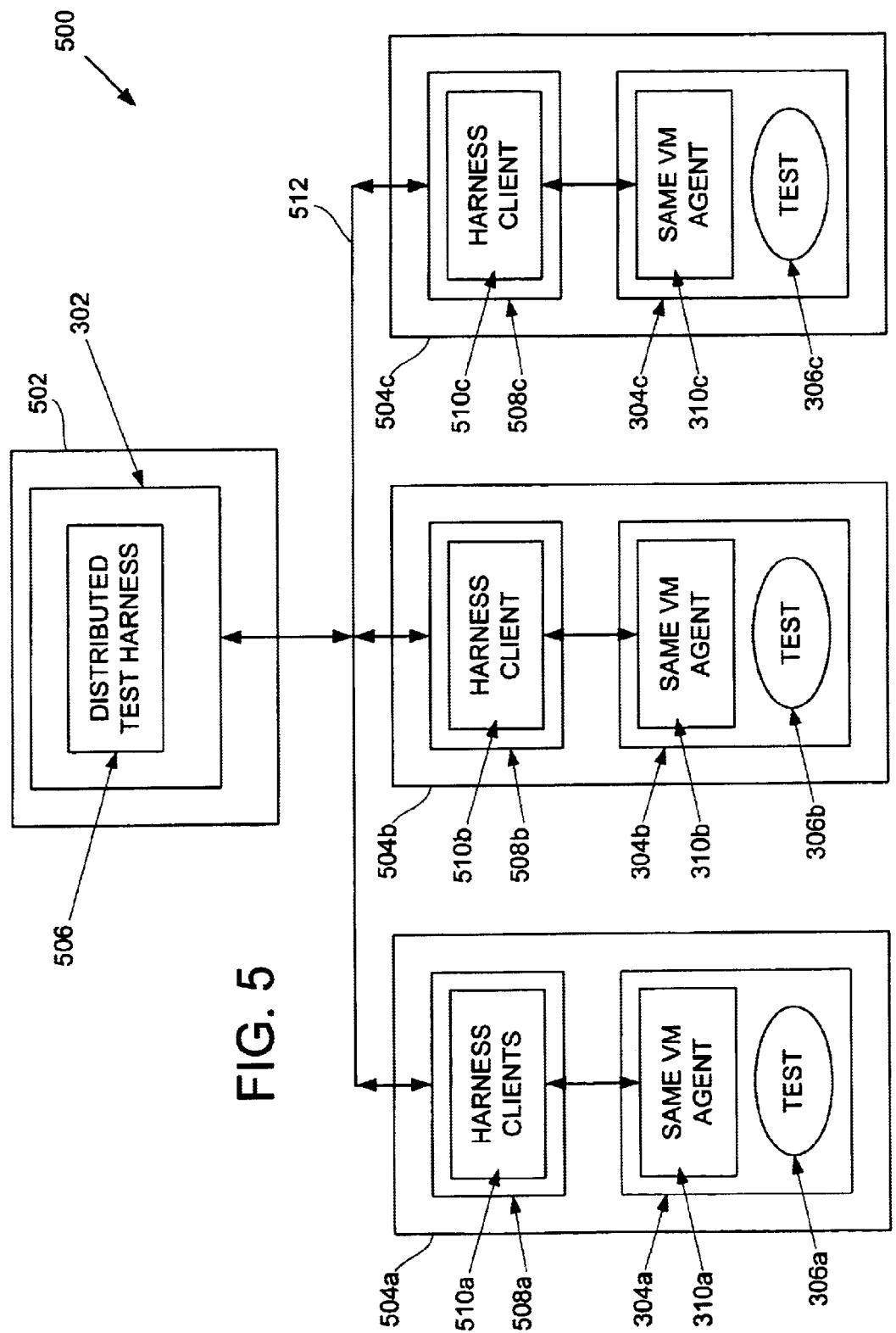
FIG. 5 is a block diagram showing a distributed enhanced same VM mode testing configuration for a distributed environment, in accordance with an embodiment of the present invention.

FIG. 5 is a block diagram showing a distributed enhanced same VM mode testing configuration 500 for use in a distributed computing environment, in accordance with an embodiment of the present invention. In addition to performing enhanced same VM mode testing on a single computer system, embodiments of the present invention can distribute the testing process across multiple systems using harness agents. The distributed enhanced same VM mode testing configuration 500 includes a test server 502 executing a distributed test harness 506 in a harness JVM 302. In addition, a plurality of client computer systems 504a–504c is included, each executing a harness client 510a–510c in a client JVM 508a–508c.

The distributed test harness 506 is in communication with each harness client 510a–510c via a network 512. Although three harness clients 510a–510b are shown in FIG. 5, it should be noted that any number of harness clients 510a–510b can be included in a distributed enhanced same VM mode testing configuration 500 of the embodiments of the present invention.

In communication with each harness client 510a–510c is same VM agent 310a–310c, each executed in a separate agent JVM 304a–304c. Each same VM agent 310a–310c is in communication with the harness client 510a–510c, which is on the same computer system 504a–504c as the particular same VM agent 310a–310c. As above, communication typically is achieve via sockets, however, it should be noted that any form of communication configuration can be utilized that facilitates data transfer between the harness client 510a–510c and the same VM agent 310a–310c.

The harness clients 510a–510c facilitate communication between the distributed test harness 506 and the same VM agents 310a–310c. In this manner, the distributed test harness 506 is able to transmit test data to each of the same VM agents 310a–310c. Specifically, for each test of the test suite, the distributed test harness 506 determines which same VM agent 310a–310c should perform the test. Once determined, the distributed test harness 506 transmits the test data to the harness client 510a–510c corresponding to the selected same VM agent 310a–310c.

For example, to utilize the same VM agent 310b, the distributed test harness 506 transmits test data to the harness client 510b, which passes the test data to the same VM agent 310b. Upon receiving the test data from the harness client 510b, the same VM agent 310b executes the test 306b using a subroutine call, as described previously with reference to FIG. 3.

Each harness client 510a–510c can facilitate communication for more than one same VM agent executing on the same client computer system as the harness client 510a–510c. As above, each same VM agent is executed within its own agent JVM 304a–304c. Also as above, the distributed test harness 506 can detect when a same VM agent 310a–310c and/or an agent JVM 304a–304c fails, and restart the failed same VM agent 310a–310c and/or an agent JVM 304a–304c, thus allowing testing to continue.

The enhanced same VM mode testing configuration can be executed in a distributed test framework (DTF) system, such as a DTF based on the Jini™ (hereinafter "Jini") technology to provide spontaneous interaction between its components. In this manner, the computer systems attach to and detach from an ad-hoc network of processing resources (e.g., computer resources) without disturbing the DTF system.

As embodiments of the present invention can use the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

Figure 6:
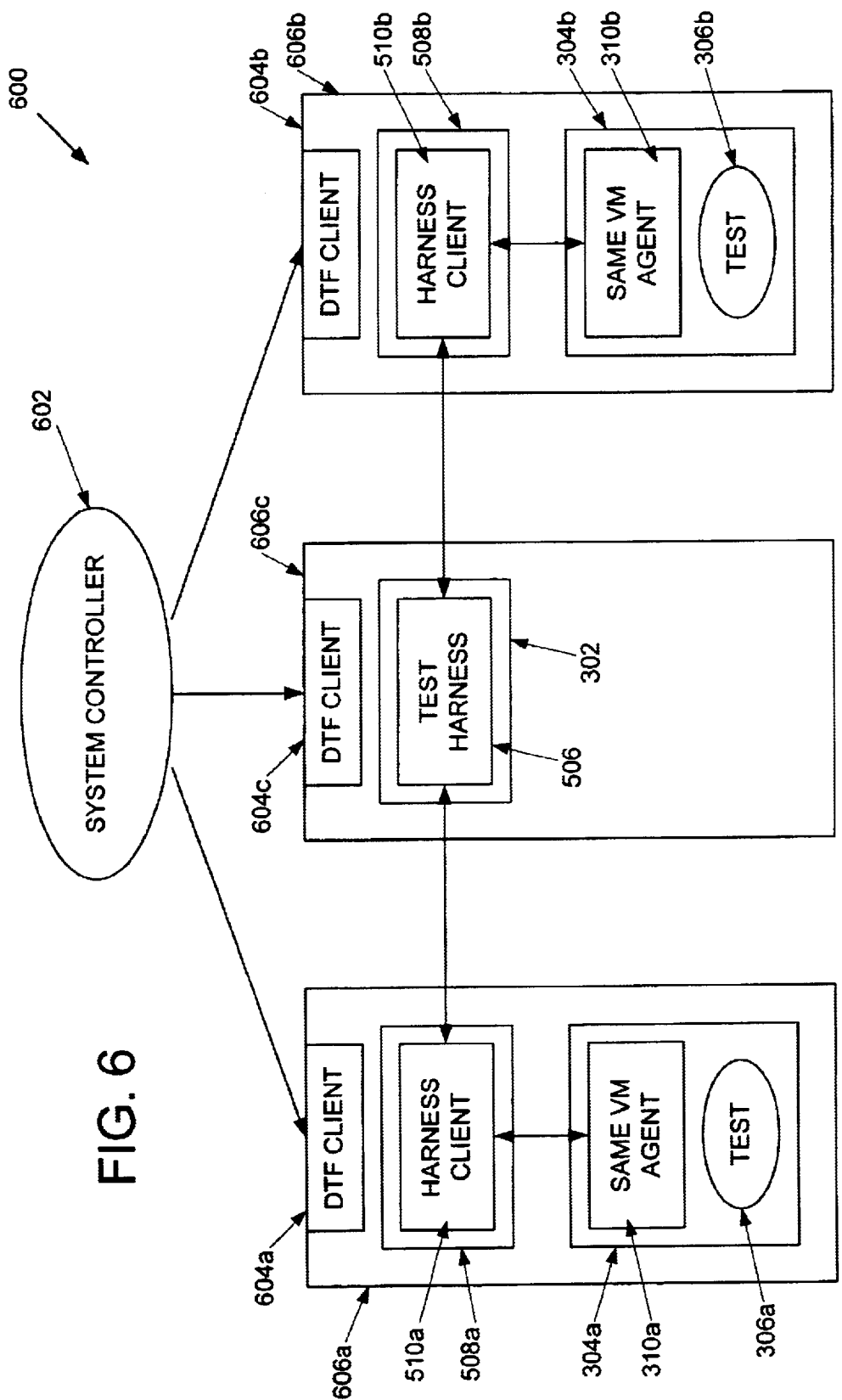
FIG. 6 is a block diagram showing a Distributed Test Framework (DTF) launched distributed test harness configuration, in accordance with an embodiment of the present invention.

FIG. 6 is a block diagram showing a DTF launched distributed test harness configuration 600, in accordance with an embodiment of the present invention. The DTF launched distributed test harness configuration 600 includes a system controller 602 in communication with a plurality of DTF clients 604a–604c, each executing on computer test systems 606a–606c.

In operation, the system controller 602 determines which computer systems are available to launch the distributed test harness 506 based on the requirements of a particular test suite. Once an appropriate computer system is found, the system controller 602 transmits a command to the DTF client 604c to launch the distributed test harness 506. In response, the DTF client 604c launches the distributed test harness 506, which initializes itself using a configuration file that provides information about the distributed operating environment. As above, the distributed test harness 506 is launched in a harness JVM 302. The configuration file also includes information regarding which harness clients are to be used for the test. Based on the configuration file, the distributed test harness 506 requests the system controller 602 to launch the appropriate harness clients.

For example, in FIG. 6, the distributed test harness 506 requests the system controller 602 to launch the harness clients 510a–510b. In response, the system controller 602 transmits a command to the DTF clients 604a and 604b to launch the harness clients 510a and 510b. Upon receiving the launch command from the system controller 602, each DTF client 604a–604b launches the appropriate harness client 510a–510b in a client JVM 508a–508b.

The distributed test harness 506 then listens for the harness clients 510a–510b that comprise the distributed harness system 600. Each harness client 510a–510b also initializes itself using a client configuration file. Each client configuration file includes information needed by the particular harness client for initialization, such as the location of the distributed test harness 506. The harness clients 510a–510b then register with the distributed test harness 506. Once the harness clients 510a–510b are initialized and registered with the distributed test harness 506, the distributed test harness 506 can begin to launch and monitor same VM agents 310a–310b on the test computer systems 606a–606b.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for performing testing in a Java based environment, comprising the operations of:

launching a test harness in a first Java virtual machine (JVM), starting a virtual machine (VM) agent in a second JVM, the VM agent being in communication with the test harness;

executing a test application utilizing the VM agent, wherein the test application and the VM agent both execute in the second JVM; and restarting the VM agent using the test harness if the second JVM fails, and further comprising the operation of passing test data from the test harness to the VM agent, the test data including a subroutine name for a subroutine that executes the test application.

2. A method as recited in claim 1, wherein the test application is executed by calling the subroutine from the VM agent.

3. A method for performing testing in a Java based environment, comprising the operations of:

launching a test harness in a first Java virtual machine (JVM);

starting a virtual machine (VM) agent in a second JVM, the VM agent being in communication with the test harness;

executing a test application utilizing the VM agent, wherein the test application and the VM agent both execute in the second JVM; and restarting the VM agent using the test harness if the second JVM fails, and further comprising the operation of monitoring the VM agent to detect failure of the VM agent.

4. A method as recited in claim 3, wherein the test harness monitors the VM agent.

5. A method for performing testing in a Java based environment, comprising the operations of:

launching a test harness in a first Java virtual machine (JVM);

starting a virtual machine (VM) agent in a second JVM, the VM agent being in communication with the test harness;

executing a test application utilizing the VM agent, wherein the test application and the VM agent both execute in the second JVM; and restarting the VM agent using the test harness if the second JVM fails, and wherein a plurality of VM agents are executed, each VM agent being executed in a separate JVM.

6. A method as recited in claim 5, wherein the test harness is in communication with each VM agent of the plurality of VM agents.

7. A method as recited in claim 6, wherein the test harness restarts any VM agent of the plurality of VM agents if the JVM executing the VM agent fails.

8. A system for performing testing in a Java based environment, comprising:

a test harness executed in a first Java virtual machine (JVM); and a virtual machine (VM) agent executed in a second JVM, the VM agent being in communication with the test harness, wherein the VM agent is capable of launching test applications in the second JVM based on test data received from the test harness, and wherein the test harness is capable of restarting the VM agent using if the second JVM fails, and wherein the test data includes a subroutine name for a subroutine that executes the test application.

9. A system as recited in claim 8, wherein the VM agent calls the subroutine to execute the test application.

10. A system as recited in claim 9, wherein the test data further includes a class name for the test application.

11. A system as recited in claim 10, wherein the test data further includes arguments associated with the subroutine.

12. A system for performing testing in a Java based environment, comprising:

a test harness executed in a first Java virtual machine (JVM); and a virtual machine (VM) agent executed in a second JVM, the VM agent being in communication with the test harness, wherein the VM agent is capable of launching test applications in the second JVM based on test data received from the test harness, and wherein the test harness is capable of restarting the VM agent using if the second JVM fails, and further comprising a plurality of VM agents, each VM agent being executed in a separate JVM.

13. A system as recited in claim 12, wherein the test harness is in communication with each VM agent of the plurality of VM agents, and wherein the test harness restarts any VM agent of the plurality of VM agents if the JVM executing the VM agent fails.

14. A system for performing testing in a distributed Java based environment, comprising:

a test harness executed in a first Java virtual machine (JVM) located on a first computer system;

a harness client executed in a second JVM located on a second computer system, the harness client being in communication with test harness; and a virtual machine (VM) agent executed in a third JVM on the second computer system, the VM agent being in communication with the harness client, wherein the harness client facilitates communication between the test harness and the VM agent, and wherein the VM agent is capable of launching test applications in the third JVM based on test data received from the test harness via the harness client, and wherein the test harness is capable of restarting the VM agent using if the third JVM fails.

15. A system as recited in claim 14, wherein the test data includes a subroutine name for a subroutine that executes the test application, and wherein the VM agent calls the subroutine to execute the test application.

16. A system as recited in claim 15, wherein the test data further includes a class name for the test application and arguments associated with the subroutine.

17. A system as recited in claim 14, further comprising a plurality of harness clients, each harness client being in communication with the test harness and an associated VM agent, each VM agent being executed in a separate JVM.

18. A system as recited in claim 17, wherein the test harness is in communication with each VM agent via the associated harness client, and wherein the test harness restarts any VM agent if the JVM executing the VM agent fails.

* * * * *